(12) United States Patent
Roberts et al.

(10) Patent No.: US 8,296,362 B2
(45) Date of Patent: Oct. 23, 2012

(54) METHODS AND APPARATUSES FOR DYNAMICALLY ENFORCING PRIVILEGES FOR USE DURING A DATA COLLABORATION SESSION

(75) Inventors: Jeff Roberts, San Jose, CA (US); Linda Wu, Sunnyvale, CA (US); Henry Nothhaft, Jr., Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1433 days.

(21) Appl. No.: 11/458,314

(22) Filed: Jul. 18, 2006

(65) Prior Publication Data

US 2008/0022002 A1    Jan. 24, 2008

(51) Int. Cl.
 *G06F 15/16* (2006.01)
 *G06F 15/173* (2006.01)
(52) U.S. Cl. ........................................ 709/204; 709/229
(58) Field of Classification Search .......... 709/203–205, 709/226, 229; 726/5, 14, 27–30; 707/9, 707/10, 104.1; 715/739–742, 748, 753
See application file for complete search history.

(56) References Cited

U.S. PATENT DOCUMENTS

| | | | |
|---|---|---|---|
| 7,092,821 B2 * | 8/2006 | Mizrahi et al. | 702/1 |
| 7,152,092 B2 * | 12/2006 | Beams et al. | 709/204 |
| 7,171,448 B1 * | 1/2007 | Danielsen et al. | 709/205 |
| 7,299,405 B1 * | 11/2007 | Lee et al. | 715/700 |
| 7,353,252 B1 * | 4/2008 | Yang et al. | 709/204 |
| 7,433,921 B2 * | 10/2008 | Ludwig et al. | 709/204 |
| 7,437,408 B2 * | 10/2008 | Schwartz et al. | 709/204 |
| 7,478,163 B2 * | 1/2009 | Alda et al. | 709/229 |
| 7,568,005 B2 * | 7/2009 | Nichols et al. | 709/204 |
| 7,581,011 B2 * | 8/2009 | Teng | 709/229 |
| 7,584,250 B1 * | 9/2009 | Chapman et al. | 709/206 |
| 7,673,047 B2 * | 3/2010 | Delany et al. | 709/225 |
| 7,904,487 B2 * | 3/2011 | Ghatare | 707/803 |
| 7,917,468 B2 * | 3/2011 | Ariel et al. | 707/610 |
| 7,984,498 B2 * | 7/2011 | Roberts et al. | 726/17 |
| 8,001,114 B2 * | 8/2011 | Chu et al. | 707/721 |
| 8,015,600 B2 * | 9/2011 | Sinn et al. | 726/10 |
| 2004/0225716 A1 * | 11/2004 | Shamir et al. | 709/204 |
| 2005/0198125 A1 * | 9/2005 | Macleod Beck et al. | 709/204 |
| 2007/0179953 A1 * | 8/2007 | Mahoney et al. | 707/9 |
| 2009/0089101 A1 * | 4/2009 | Hashim | 705/4 |
| 2011/0083090 A1 * | 4/2011 | Gwiazda et al. | 715/769 |

* cited by examiner

*Primary Examiner* — Lynn Feild
*Assistant Examiner* — Melvin H Pollack (57) ABSTRACT

In one embodiment, the methods and apparatuses detect a first participant wherein the first participant corresponds with a primary group name; identify a profile based on the primary group name; detect a second participant; identify a secondary group name based on the second participant; select a privilege within the profile based on the secondary group name; and apply the privilege to the first participant and the second participant.

20 Claims, 6 Drawing Sheets

METHODS AND APPARATUSES FOR DYNAMICALLY ENFORCING PRIVILEGES FOR USE DURING A DATA COLLABORATION SESSION

FIELD OF INVENTION

The present invention relates generally to enforcing privileges and, more particularly, to dynamically enforcing privileges during a data collaboration session.

BACKGROUND

There are many settings that allow a user to locally configure the recording function on a device. In many cases, the user is capable of customizing the recording capabilities of this local device.

SUMMARY

In one embodiment, the methods and apparatuses detect a first participant wherein the first participant corresponds with a primary group name; identify a profile based on the primary group name; detect a second participant; identify a secondary group name based on the second participant; select a privilege within the profile based on the secondary group name; and apply the privilege to the first participant and the second participant.

BRIEF DESCRIPTION OF THE DRAWINGS

The accompanying drawings, which are incorporated in and constitute a part of this specification, illustrate and explain one embodiment of the methods and apparatuses for dynamically enforcing privileges during a data collaboration session.

In the drawings.

DETAILED DESCRIPTION

The following detailed description of the methods and apparatuses for dynamically enforcing privileges during a data collaboration session refers to the accompanying drawings. The detailed description is not intended to limit the methods and apparatuses for dynamically enforcing privileges during a data collaboration session. Instead, the scope of the methods and apparatuses for dynamically enforcing privileges during a data collaboration session is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

References to a data collaboration session include sharing data among multiple devices. The data may include audio, textual, and/or graphical information.

In one embodiment, the methods and apparatuses for dynamically enforcing privileges during a data collaboration session selectively apply different privileges to be during a data collaboration session among multiple devices. The selection of a specific privilege depends on the specific devices, the specific groups, and the customization of the profile.

Figure 1:
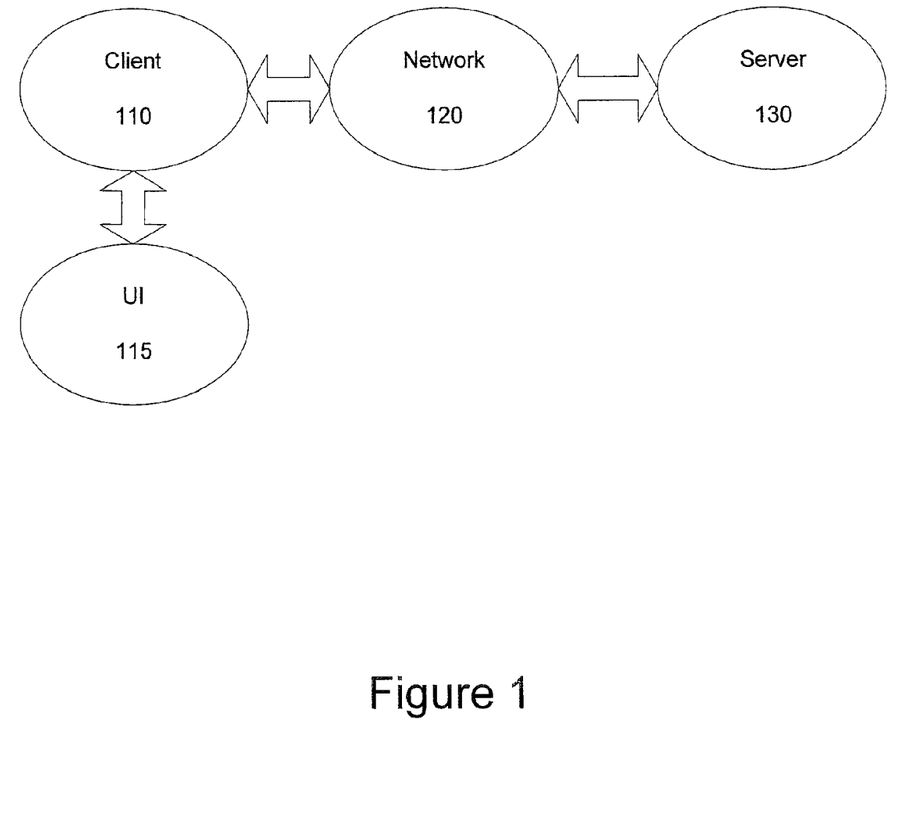
FIG. 1 is a diagram illustrating an environment within which the methods and apparatuses for dynamically enforcing privileges during a data collaboration session are implemented.

FIG. 1 is a diagram illustrating an environment within which the methods and apparatuses for dynamically enforcing privileges during a data collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of dynamically enforcing privileges during a data collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
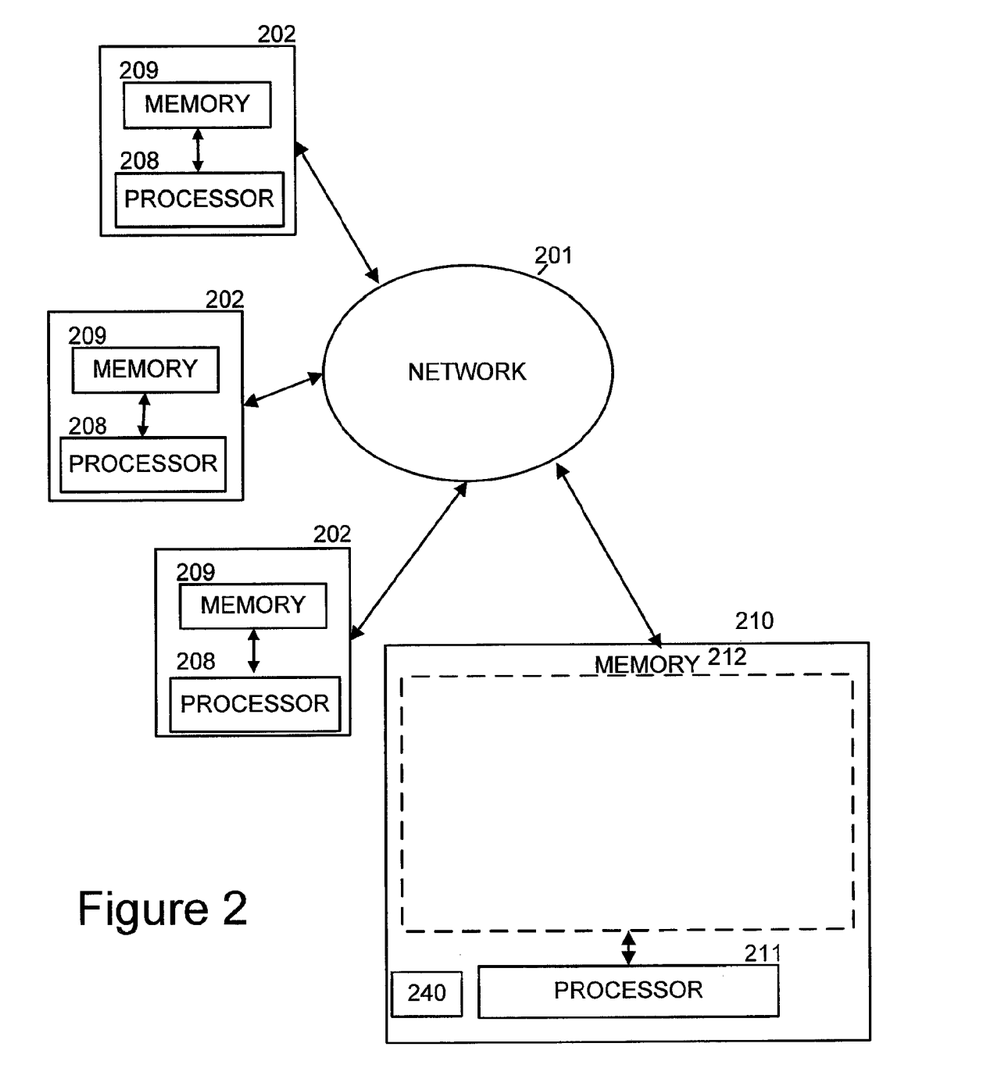
FIG. 2 is a simplified block diagram illustrating one embodiment in which the methods and apparatuses for dynamically enforcing privileges during a data collaboration session are implemented.

FIG. 2 is a simplified diagram illustrating an exemplary architecture in which the methods and apparatuses for dynamically enforcing privileges during a data collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for dynamically enforcing privileges during a data collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on dynamically enforcing privileges during a data collaboration sessions determined using embodiments described below.

Figure 3:
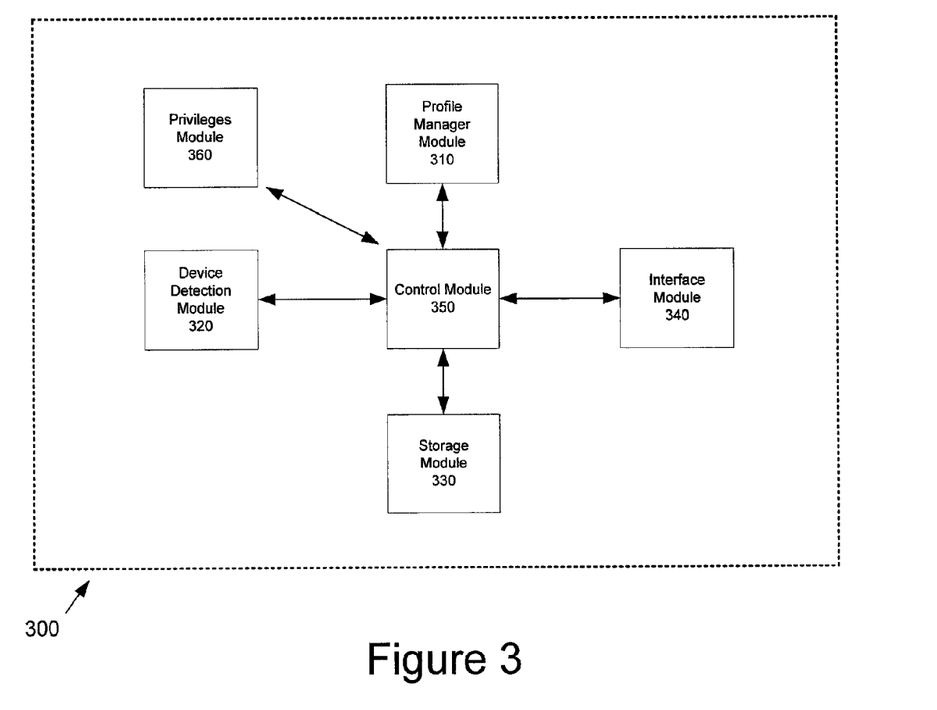
FIG. 3 is a simplified block diagram illustrating a system, consistent with one embodiment of the methods and apparatuses selectively controlling a remote device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a device detection module 320, a storage module 330, an interface module 340, a control module 350, and a privileges module 360.

In one embodiment, the control module 350 communicates with the profile manager module 310, the device detection module 320, the storage module 330, the interface module 340, the control module 350, and the privileges module 360. In one embodiment, the control module 350 coordinates tasks, requests, and communications between the profile manager module 310, the device detection module 320, the storage module 330, the interface module 340, the control module 350, and the privileges module 360.

In one embodiment, the profile manager module 310 organizes and tracks the profiles. In one embodiment, each profile corresponds to a device. In another embodiment, each profile corresponds to a group of devices.

In another embodiment, each profile corresponds to devices associated with a company.

In one embodiment, the device detection module 320 detects and identifies the identity of the device. In one embodiment, the device detection module 320 detects the identity of device through the Internet Protocol address associated with the device.

In one embodiment, the storage module 330 stores a record including a profile associated with the each device or group of devices. An exemplary profile is shown in a record 400 within FIG. 4.

In one embodiment, the interface module 340 detects the presence of a device through the network 120.

Figure 4:
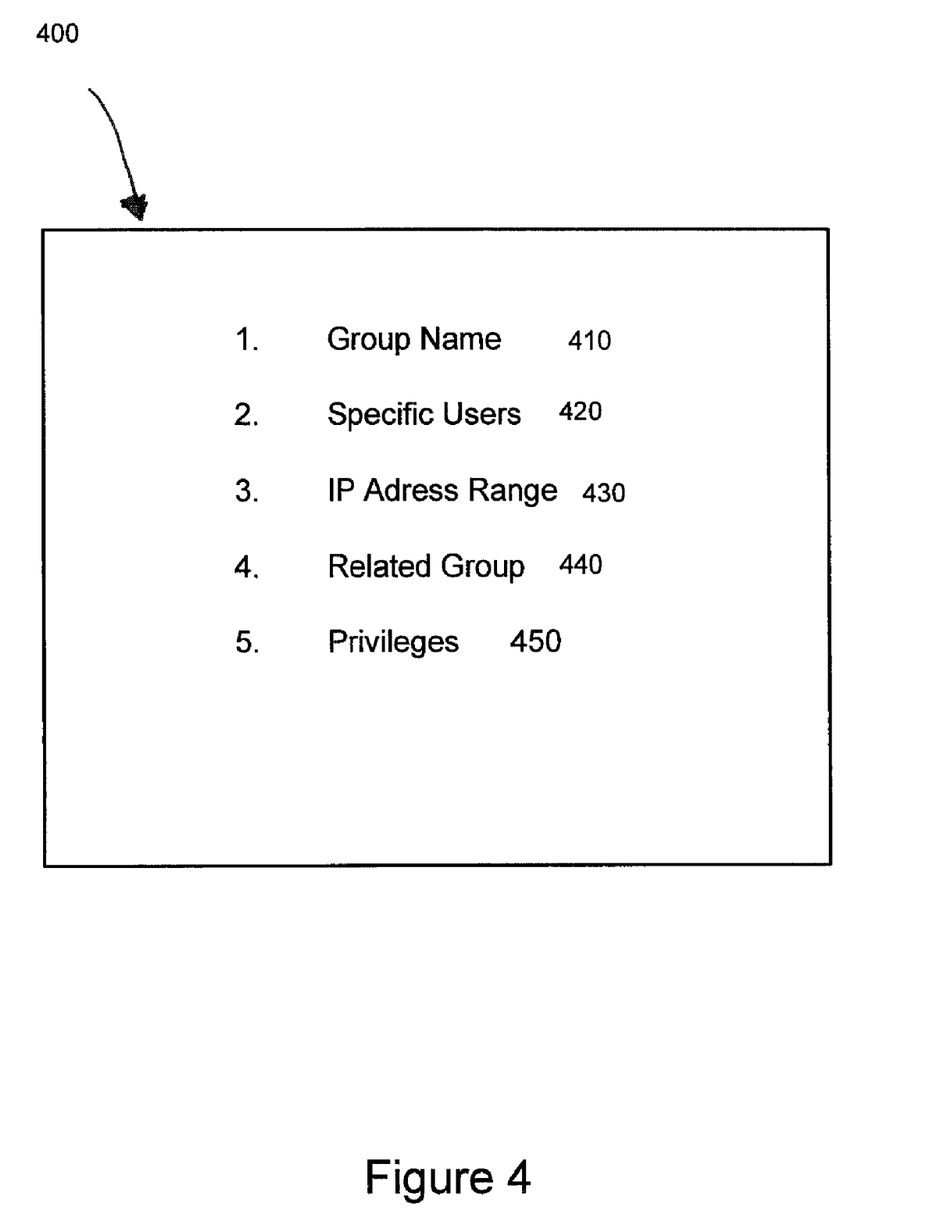
FIG. 4 is an exemplary record for use with the methods and apparatuses for dynamically enforcing privileges during a data collaboration session.

In one embodiment, the privileges module 360 is configured to organize the different configurations of collaboration privileges that are associated with a group of devices. In one embodiment, the group of devices is defined by a common association of these devices such as a company. Examples of specific privileges are shown in an exemplary record 400 and the following examples.

The system 300 in FIG. 3 is shown for exemplary purposes and is merely one embodiment of the methods and apparatuses for dynamically enforcing privileges during a data collaboration session. Additional modules may be added to the system 300 without departing from the scope of the methods and apparatuses for dynamically enforcing privileges during a data collaboration session. Similarly, modules may be combined or deleted without departing from the scope of the methods and apparatuses for dynamically enforcing privileges during a data collaboration session.

FIG. 4 illustrates an exemplary record 400 for use with the methods and apparatuses for dynamically enforcing privileges during a data collaboration session. In one embodiment, the record 400 illustrates an exemplary record associated with managing the different rules and privileges of transmitting data among multiple devices.

In one embodiment, there are multiple records such that each record 400 is associated with a particular group of devices. Further, each device may correspond with multiple records wherein each record 400 is associated with a particular profile associated with the device.

In one embodiment, the record 400 includes a group name field 410, a specific user field 420, an IP address range field 430, a related group field 440, and a privileges field 450. In one embodiment, the record 400 resides within the client 110. In another embodiment, the record 400 resides within the server 130.

In one embodiment, the group name field 410 includes information related to the identity of the group. For example, the group name field 410 may include a company name that includes the group of devices.

In one embodiment, the specific user field 420 includes a listing of devices that are associated with the specific group name from the group name field 410. For example, the listing of devices are associated with the particular group.

In one embodiment, the specific user field 420 includes information related to the identity of the device as the serial number associated with the device and/or the login identification for the user of the particular device. For example, each device has a unique serial number identifying this particular device. Further, the login identification for an approved user also identifies that the user of the device is authorized to be included within the group identified by the group name field 410.

In one embodiment, the IP address range field 430 identifies the range of IP addresses that are recognized to be utilized by devices within the group as identified by the group name field 410. In one embodiment, specific IP address ranges are utilized by a company. Further, by logging onto a corporate intranet, an authorized device may also utilize an IP address within the prescribed range even though a user of the device may utilize DSL or a remote telephone line to access the Internet.

In one embodiment, the related group field 440 allows devices associated with a different group than the group identified within the group name field 410 to be recognized. In one embodiment, the devices associated with the group identified within the related group field 440 are also identified by information contained within the group name field 410, the specific user field 420, and the IP address range field 430.

In one embodiment, the privileges field 450 identifies different privileges for a data collaboration session between multiple devices. For example, the privileges may restrict the ability of certain devices to record, copy, view, and/or access data shared during the data collaboration session.

Figure 5:
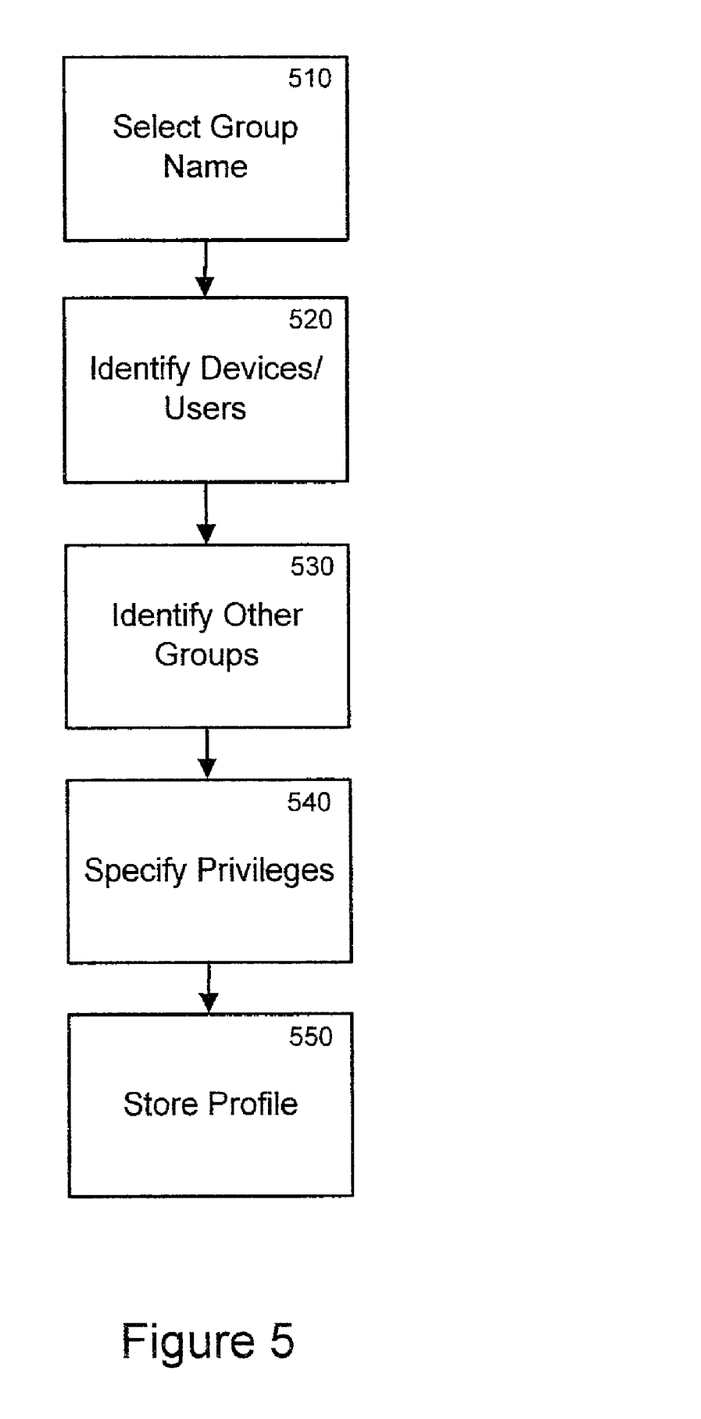
FIG. 5 is a flow diagram consistent with one embodiment of the methods and apparatuses for dynamically enforcing privileges during a data collaboration session.
Figure 6:
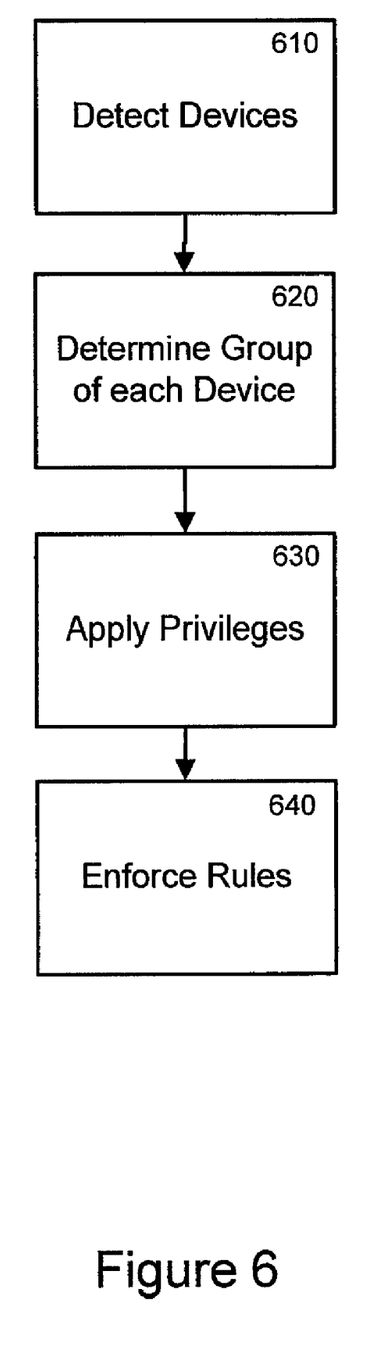
FIG. 6 is a flow diagram consistent with one embodiment of the methods and apparatuses for dynamically enforcing privileges during a data collaboration session.

The flow diagrams as depicted in FIGS. 5 and 6 are one embodiment of the methods and apparatuses for dynamically enforcing privileges during a data collaboration session. The blocks within the flow diagrams can be performed in a different sequence without departing from the spirit of the methods and apparatuses for dynamically enforcing privileges during a data collaboration session. Further, blocks can be deleted, added, or combined without departing from the spirit of the methods and apparatuses for dynamically enforcing privileges during a data collaboration session.

The flow diagram in FIG. 5 illustrates customizing an exemplary record for transmission of data during a data collaboration session according to one embodiment of the invention.

In Block 510, a group name is selected. In one embodiment, the group name is associated with a specific company.

In Block 520, devices and users that are associated with the specific company are identified. In one embodiment, the device serial number may be utilized to identify specific devices. In another embodiment, the IP address ranges and/or login identifications may be utilized to identify specific users. In one embodiment, any number of users and/or devices may be associated with the specific company.

In Block 530, other groups are identified. In one embodiment, other companies and their associated users are identified.

In Block 540, specific privileges are selected between various users and/or devices. In one instance, exemplary privileges include limiting the data shared during the data collaboration session, limiting the transmission of documents from one device to another, limiting the recording of the data collaboration session, and the like.

Further, the specific privileges can be configured differently depending on the company associated with each device or user. For example, users/devices from company A may have liberal privileges during a data collaboration session among themselves. However, the users/devices from company A may have restricted privileges when collaborating with users from company B or an unknown company.

In Block 550, the profile for the specific company including the associated users/devices, associated companies, and specific privileges are stored with a storage module 330.

The flow diagram in FIG. 6 illustrates limiting transmission of data during a data collaboration session according to one embodiment of the invention.

In Block 610, a device is detected. In one embodiment, the device is identified through a login identification that uniquely identifies that device. In another embodiment, the login identification uniquely identifies the particular user.

In another embodiment, the device is identified through the IP address that is utilized by the device.

In Block 620, the devices detected within the Block 610 are categorized into groups. Some exemplary groups include Company A, Company B, and undetermined. For example, if the device's IP address range or login identification is recognized as being included within the attributes of Company A, then this particular device is categorized as associated with Company A. Similarly, if the device's IP address range or login identification is not recognized as being included within the attributes of a group, then the device would be categorized and undetermined.

In Block 630, privileges and limitations are identified. In one embodiment, exemplary privileges and limitations include transmission of data, recording the data collaboration session, and receipt of data.

In Block 640, the privileges and limitations are selectively applied to each device based on the categorization of the devices and the application rules of each privilege and limitation.

In an exemplary scenario A, a data collaboration session is hosted by participant A and attended by participant B. In this scenario, both participants A and B are identified as belonging to company A. In one embodiment, the participants A and B are associated with company A through the device utilized by each of the participants A and B. The devices may be associated with company A through an IP address range, a serial number, and the like. In another embodiment, the participants may be identified through a login identification that associates each participant with company A. In one embodiment, when participants A and B are both associated with company A, the restrictions of sharing data and recording the data collaboration session may be minimized to allow maximum access and recording.

In another scenario B, a data collaboration session is hosted by participant A and attended by participants B and C. In this scenario, both participants A and B are identified as belonging to company A; and participant C is identified as belonging to company B. In one embodiment, the participants are associated with a specific company through the device utilized by each of the participants. The devices may be associated with the specific company through an IP address range, a serial number, and the like. In another embodiment, the participants may be identified through a login identification that associates each participant with a specific company. In one embodiment, when participants A and B are both associated with company A, the restrictions of sharing data and recording the data collaboration session between participants A and B may be minimized to allow maximum access and recording. However, restrictions may be placed on data flowing between participants A and B and participant C. For example, data flowing from participants A and B to participant C may be restricted. Further, participant C may be prevented from recording the data collaboration session.

In one embodiment, participant C is subject to the limitations and restrictions imposed by company A. Further, the limitations and restrictions imposed by company A are represented by an exemplary record 400 in one embodiment.

In another embodiment within the scenario B, data flowing from participant C to participants A and B may be restricted. Further, participants A and B may be prevented from recording the data collaboration session. Participants A and B are subject to the limitations and restrictions imposed by company B. Further, the limitations and restrictions imposed by company B are represented by an exemplary record 400 in one embodiment.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    detecting a first participant in a data collaboration session for sharing data among a plurality of participant devices wherein the first participant is associated with a first group of participants having a primary group name;
    identifying a profile based on the primary group name;
    detecting a second participant in the data collaboration session wherein the second participant is associated with a second group of participants;

identifying a secondary group name based on the second participant of the second group of participants;

selecting a privilege from within the profile of the first group of participants based on the secondary group name; and applying the privilege from within the profile of the first group of participants to the first participant and the second participant, wherein the privilege from within the profile of the first group of participants restricts how data flows during the data collaboration session from the first group of participants to the second participant over a network.

2. The method according to claim 1 wherein the privilege from within the profile of the first group of participants includes one of limiting a quantity of data transmitted to the second participant, limiting the type of data transmitted to the second participant, limiting recording of the data collaboration session when initiated by the second participant, and limiting transmission of an attachment to the second participant.

3. The method according to claim 2 wherein the attachment includes one of a document, a presentation, an audio file, a graphical file, a textual file, and a spreadsheet.

4. The method according to claim 1 wherein detecting the second participant further comprises detecting a serial number of a device utilized by the second participant.

5. The method according to claim 1 wherein detecting the second participant further comprises detecting an IP address associated with a device utilized by the second participant.

6. The method according to claim 1 wherein detecting the second participant further comprises detecting a login identification utilized by the second participant.

7. The method according to claim 1 wherein the secondary group name is a known company.

8. The method according to claim 1 wherein the secondary group name is an unknown company.

9. The method according to claim 1 further comprising initiating the data collaboration session between the first participant and the second participant over the network.

10. The method according to claim 1 wherein the primary group name and the secondary group name correspond to a common company.

11. A method comprising:

detecting a first participant in a data collaboration session for sharing data among a plurality of participant devices wherein the first participant is associated with a first group of participants having a primary group name;

identifying a first profile based on the primary group name of the first group of participants;

detecting a second participant in the data collaboration session;

identifying a secondary group name based on the second participant;

selecting a privilege from the first profile of the first group of participants based on the secondary group name; and limiting data access to the second participant over a network during the data collaboration session based on the privilege of the first profile of the first group of participants.

12. The method according to claim 11 wherein the privilege from the first profile of the first group of participants includes one of limiting a quantity of data transmitted to the second participant, limiting the type of data transmitted to the second participant, limiting recording of the data collaboration session when initiated by the second participant, and limiting transmission of an attachment to the second participant.

13. The method according to claim 12 wherein the attachment includes one of a document, a presentation, an audio file, a graphical file, a textual file, and a spreadsheet.

14. The method according to claim 11 further comprising initiating by the first participant the data collaboration session over the network between the first participant and the second participant.

15. The method according to claim 14 wherein data is selectively shared between the first participant and the second participant through the data collaboration session depending on the privilege.

16. A system, comprising:

a processor; and a memory configured to store a plurality of software modules executable by the processor, the software modules including, a device detection module configured to determine an identity of a participant of a first group of participants participating in a data collaboration session for sharing data among a plurality of participant devices;

a profile manager module configured to track a profile of the first group of participants, wherein the profile of the first group of participants includes privilege information associated with a second participant, wherein the privilege information restricts transmission of information from the first group of participants to the second participant during the data collaboration session; and an interface module configured to identify devices associated with the first group of participants and a device associated with the second participant in order to restrict the transmission of the information during the data collaboration session.

17. The system according to claim 16 further comprising a storage module configured to store the profile of the first group of participants.

18. The system according to claim 16 further comprising a privileges module for managing a plurality of privileges wherein each of the privileges is configured to limit transmission of data during the collaboration session.

19. The method of claim 11, further comprising:

identifying a second profile based on the secondary group name;

selecting a privilege from the second profile based on the primary group name; and selectively sharing data between the first participant and the second participant through the data collaboration session depending on the privilege selected from the second profile.

20. The method of claim 11 wherein limiting comprises limiting data access to the first participant over the network during the data collaboration session based on the privilege of the profile of the first group of participants.

* * * * *